(12) United States Patent
Hall et al.

(10) Patent No.: US 7,669,537 B1
(45) Date of Patent: Mar. 2, 2010

(54) KNIFE OPENER FOR USE WITH AN AGRICULTURAL IMPLEMENT

(75) Inventors: Kevin Hall, Saskatoon (CA); Nicholas Ryder, Saskatoon (CA)

(73) Assignee: CNH Canada, Ltd., Saskatoon, SK (CA)

( * ) Notice: Subject to any disclaimer, the term of this patent is extended or adjusted under 35 U.S.C. 154(b) by 0 days.

(21) Appl. No.: 12/258,166

(22) Filed: Oct. 24, 2008

Related U.S. Application Data

(63) Continuation of application No. 12/203,269, filed on Sep. 3, 2008, now abandoned.

(51) Int. Cl.
 *A01C 5/00* (2006.01)
 *A01C 7/00* (2006.01)
 *A01C 9/00* (2006.01)
(52) U.S. Cl. ..................... 111/156; 111/187
(58) Field of Classification Search ......... 111/118–129, 111/149–156, 186–188
 See application file for complete search history.

(56) References Cited

U.S. PATENT DOCUMENTS

| | | |
|---|---|---|
| 4,638,748 A | 1/1987 | Kopecky |
| 5,269,237 A | 12/1993 | Baker et al. |
| 5,537,942 A | 7/1996 | Wickstrom |
| 6,178,900 B1 | 1/2001 | Dietrich, Sr. |
| 6,408,772 B1 | 6/2002 | Lempriere |
| 6,457,426 B1 | 10/2002 | Cruson |
| 6,966,270 B2 | 11/2005 | Rowlett et al. |
| 6,986,314 B2 | 1/2006 | Linnebur et al. |
| 7,096,803 B2 | 8/2006 | Bergen |
| 7,290,491 B2 | 11/2007 | Summach et al. |
| 2005/0229826 A1* | 10/2005 | Summach et al. ............. 111/14 |
| 2005/0274309 A1* | 12/2005 | Bergen ........................ 111/188 |

FOREIGN PATENT DOCUMENTS

| | | |
|---|---|---|
| EP | 000183203 | 6/1986 |
| FR | 002727601 | 6/1996 |

\* cited by examiner

*Primary Examiner*—Christopher J. Novosad
(74) *Attorney, Agent, or Firm*—Rebecca L. Henkel; John William Stader

(57) ABSTRACT

A knife opener includes a pair of flared blades designed to cut spaced, but paired furrows. The knife opener is particularly well-suited for use in no-till or minimum-till agricultural operations primarily in conjunction with seed and/or fertilizer placement adjacent a soil cut-line generally in the direction of travel. In addition to being angled away from the main body of the knife, one of the blades is angled forward and the other blade is angled rearward. Seed and/or fertilizer dispensing receivers may be associated with each of the blades.

8 Claims, 4 Drawing Sheets

KNIFE OPENER FOR USE WITH AN AGRICULTURAL IMPLEMENT

CROSS-REFERENCE TO RELATED APPLICATIONS

This application is a continuation application of U.S. Ser. No. 12/203,269, filed Sep. 3, 2008 now abandoned.

BACKGROUND OF THE INVENTION

The present invention relates to knife opener which may be used as part of no-till or minimum-till farming practices primarily for placement in the ground of seed and/or fertilizer and other materials.

Important advantages have been found in soil preparation, and seed and fertilizer delivery in employing no-tilling or minimum tilling methods which cause minimum disturbance to the soil. This is particularly important in drier soil conditions where the soil is subject to moisture and topsoil loss if conventional tilling methods are used. It is usually desirable when employing no-till farming practices to disturb the soil surface as little as possible. The surface will be covered with the residue from previous crops, and the surface layer will contain old root structure. This plant material can serve to retain moisture below the surface and to assist in securing the soil against runoff and erosion.

Fertilizer is commonly used to improve crop yields. Broadcasting the fertilizer on the surface is a method that does not disturb the surface, but it can be inefficient as much of the fertilizer can be lost due to runoff surface water. As such, a number of soil bed preparation tools have been developed that are designed to place fertilizer directly in the soil. An example of such a device is a double shoot air drill which enables seed and fertilizer to be deposited as a knife, coulter or other device is towed through the soil.

Zero till or minimum till devices have been developed to deposit high concentrations of fertilizer in the furrows formed by the knife or other furrowing tool. If the seed is placed in close proximity to a high concentration of fertilizer, burning of the newly germinated plant can result. Thus, with higher fertilizer concentrations, it is generally desired to space the fertilizer from the seed, either laterally and/or vertically.

As noted above, one type of furrow opening tool is a knife. To achieve adequate separation either vertically or horizontally with a knife has required the knife to occupy a relatively large amount of space either in the soil or above the soil. In the case of the former, the knife opens a relatively large furrow thereby resulting in greater soil disturbance. In the case of the latter, the flow of residue around the knife can be impeded.

If the flow of residue is impeded that residue tends to collect around the knife and is dragged with the knife as the implement is towed. Not only can this residue collection impair operation of the implement, it also removes the desired moisture retaining cover that may be provided by the residue.

Another type of furrowing device is a coulter or disk opener. While disk openers have the ability to cut through most residue, some crop residue, such as straw, may not cut easily, and as a result may be pushed into the furrow, a result commonly called hair-pinning. This can displace seeds, as well as drying out the seed bed. Additionally, effective no-till disc openers can be quite costly.

Thus, there remains a need for a knife opener that cuts a furrow with reduced soil disturbance yet provides the desired spacing for higher concentrations of fertilizer. There is also a need for such a knife opener which provides tilling and/or seeding, fertilizing, or weed clearing in a single pass without significant trash accumulation.

SUMMARY OF THE INVENTION

The invention provides a ground opening knife for use in no-till or minimum-till farming operations primarily in conjunction with seed and/or fertilizer placement adjacent a soil cut-line generally in the direction of travel. The knife opener has a pair of cutting members or blades flared in opposite directions from one another relative to a vertical axis of the knife. In addition to be angled away from the main body of the opener, one of the cutting members is angled forward of the main body. Conversely, the other cutting member is angled rearward of the main body. These forward and rearward cutting members are designed to cut respective furrows into which seed and/or fertilizer may be deposited. As such, in one embodiment, respective product dispensing tubes are mounted to the opener and are designed to deposit particulate matter, such as seed and fertilizer, in the furrow as the cutting members cut through the soil.

The invention also provides a no-till or minimum-till farm implement primarily for use in conjunction with cultivation or materials placement adjacent a plurality of soil cut-lines generally parallel and in the direction of travel comprising a support frame structure, a plurality of ground opening knives attached to the support structure spaced from each other in a direction transverse to the direction of travel of the implement and each adapted to cut the soil along adjacent cut-lines. Each knife has a pair of flared cutting members.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
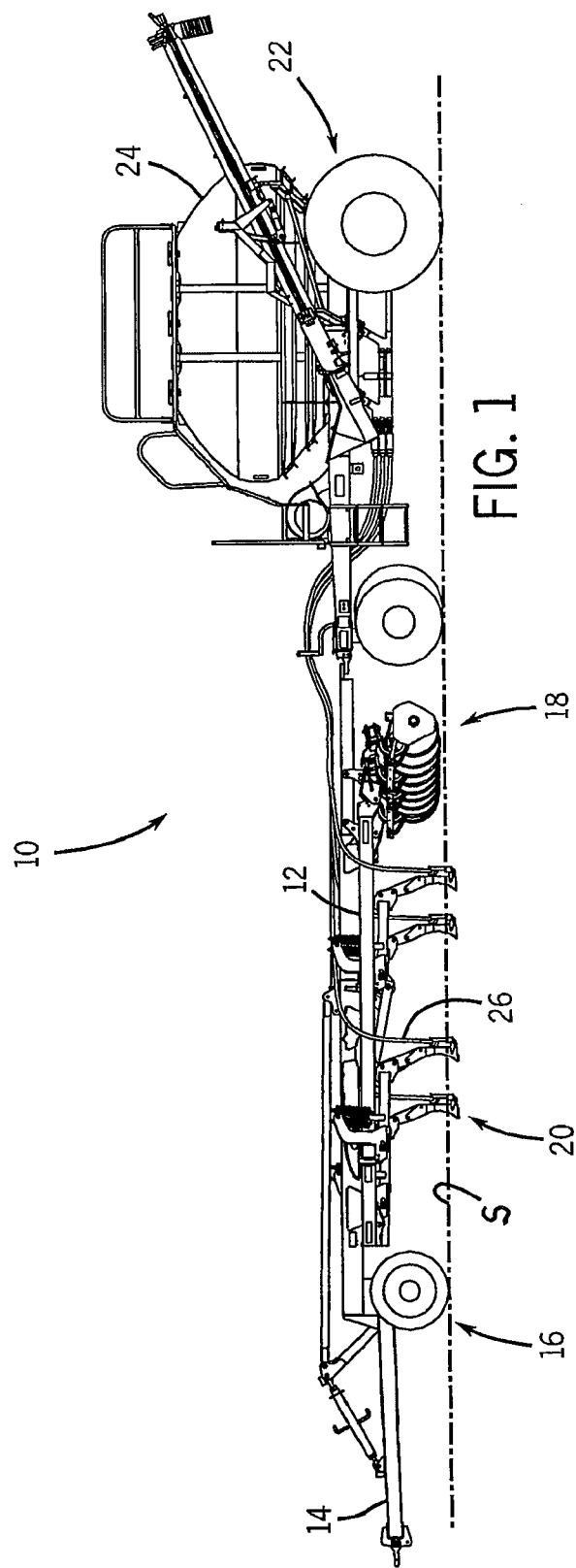
FIG. 1 is a side elevation view of an agricultural implement incorporating knife openers according to one embodiment of the present invention.

FIG. 1 shows an air hoe drill 10 designed to form multiple furrows in a surface, e.g., farm field, and deposit seed and/or fertilizer in the furrows. The air hoe drill 10 is representative of one type of agricultural implement with which the present invention may be used. Generally, the drill 10 includes a frame 12 coupled in a known manner to a tow bar 14 that facilitates attachment of the frame 14 to a tractor (not shown)

or other towing vehicle. The frame 12 is supported above the planting surface S by a series of forward wheels 16 and rear packing wheels 18. As known in the art, the packing wheels 18 not only support the frame 12 but also serve to pack the furrows after seed and/or fertilizer has been deposited. In this regard, the packing wheels 18 are aligned with a series of knife openers 20 that are mounted in a known manner to the frame 12. The depth of the knife openers 20 can be set and adjusted by raising and lowering the frame 12 relative to the wheels 16, 18 as known in the art. In one representative embodiment, the knife openers 20 are equally spaced from one another in a direction transverse to the path of travel of the drill 10. The drill 10 further includes an air cart 22 that includes a tank 24 for carrying seed and/or fertilizer. The particulate is fed from the tank 24 to the furrows using seed tubes 26 that are associated with the knife openers. One skilled in the art will appreciate that the air hoe drill shown in FIG. 1 is merely representative of one type of agricultural implement that can incorporate the present invention. For example, the invention may also be applicable with a precision air hoe drill where the frame is supported by a set of forward wheels and a set of rearward wheels, and having a series of trailing arms and/or parallel links to which knife openers such as those described herein may be substantially attached together with packer wheels.

Figure 2:
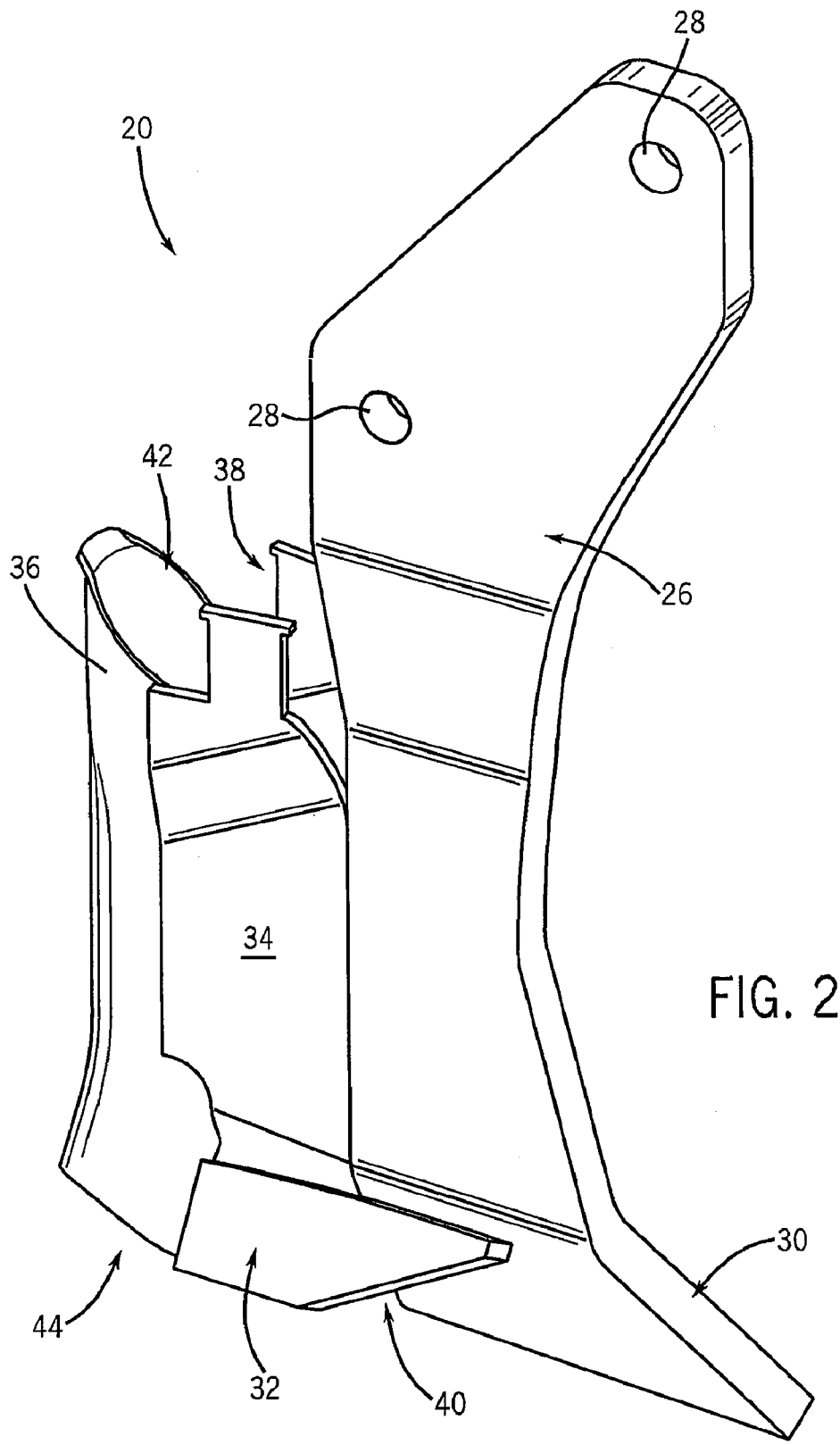
FIG. 2 is an isometric view of a knife opener for use with the implement shown in FIG. 1 according to one embodiment of the present invention.

Referring now to FIG. 2, a representative knife opener 20 according to the present invention is shown. While a single knife opener 20 will be described, it is appreciated that the other knife openers of the drill 10 shown in FIG. 1 are similarly constructed. The knife opener 20 includes a shank 26 which may be mounted to the frame 12 in a known fashion. The shank 26 preferably has a pair of holes 28 adapted to receive fasteners (not shown), e.g., mounting bolts, for attaching the knife opener 20 to the frame 12.

Knife opener 20 includes a forward biased blade 30 formed to penetrate the soil along a soil-cut line oriented in the direction of travel. Knife opener 20 further includes a rearward biased blade 32 that is formed to penetrate the soil along a separate soil-cut line oriented in the direction of travel. Each of the blades 30, 32 is flared away from the shank 26 and, as such, each blade penetrates the soil along respective, but generally parallel soil-cut lines. In this regard, the soil-cut lines are paired with one another but spaced to accommodate a desired spacing between fertilizer and seed.

Adjacent the respective backsides of blades 30, 32 are seed tube receivers 34, 36, respectively. Receiver 34 has an inlet 38 adapted to receive a seed tube or hose (not shown) that is fluidly linked with the tank 24 of the air seeder 22. The receiver 34 further has an outlet 40 or mouth that is disposed generally behind blade 30. Particulate matter is fed, generally by forced air, from the tank through the seed tubes to the outlet 40 whereupon the matter is deposited in the furrow created by blade 30. Similarly, receiver 36 has an inlet 42 adapted to receive a seed tube or hose (not shown) that is fluidly linked with the tank 24 of the air seeder 22. The receiver 36 has an outlet 44 or mouth that is disposed generally behind blade 32. Particulate matter is fed, generally by forced air, from the tank through the seed tube to the outlet 44 whereupon the matter is deposited in the furrow created by blade 32. The receivers 32 and 36 are placed such that the respective outlets 40 and 44 are generally in plane with the lowermost surfaces of blades 30 and 32, respectively. Placement of the receivers behind the blades also serves to protect the receivers, and the seed tubes received therein, from damage during the seeding or fertilizing process.

Figure 3:
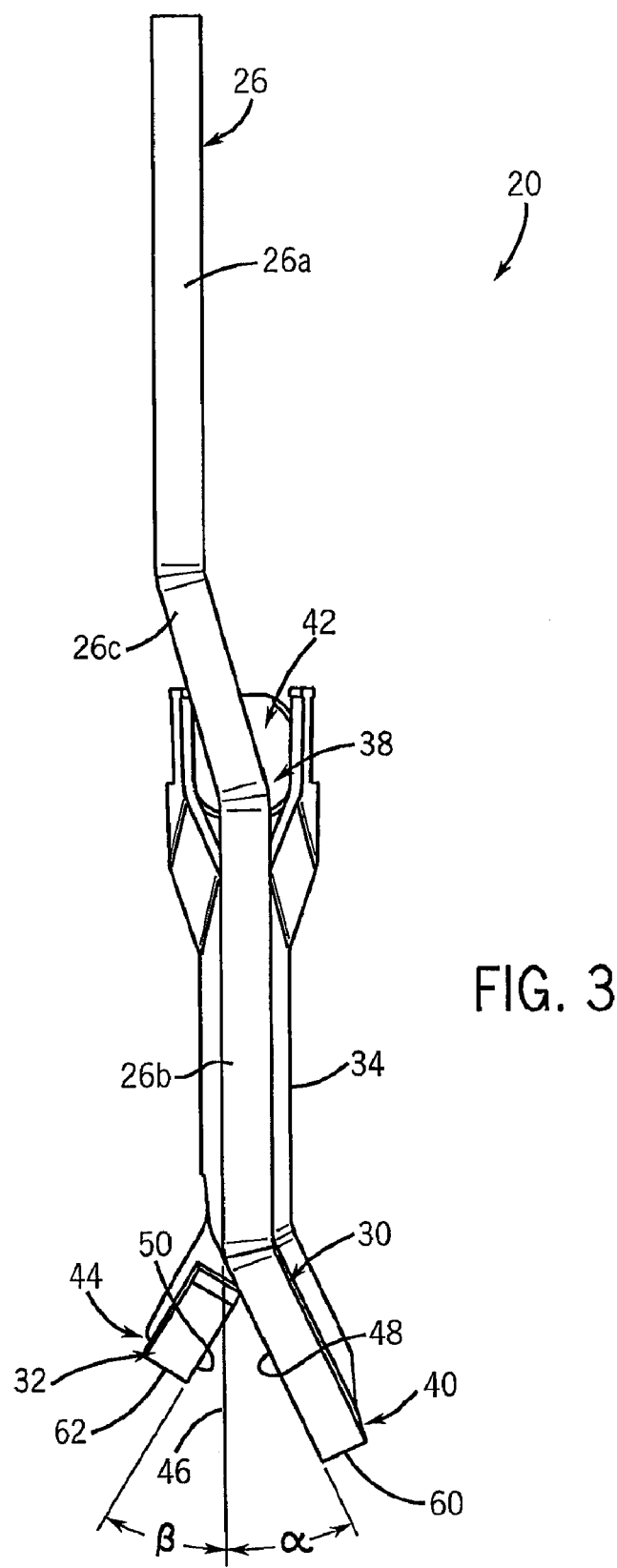
FIG. 3 is a front elevation view of the knife opener shown in FIG. 2.
Figure 4:
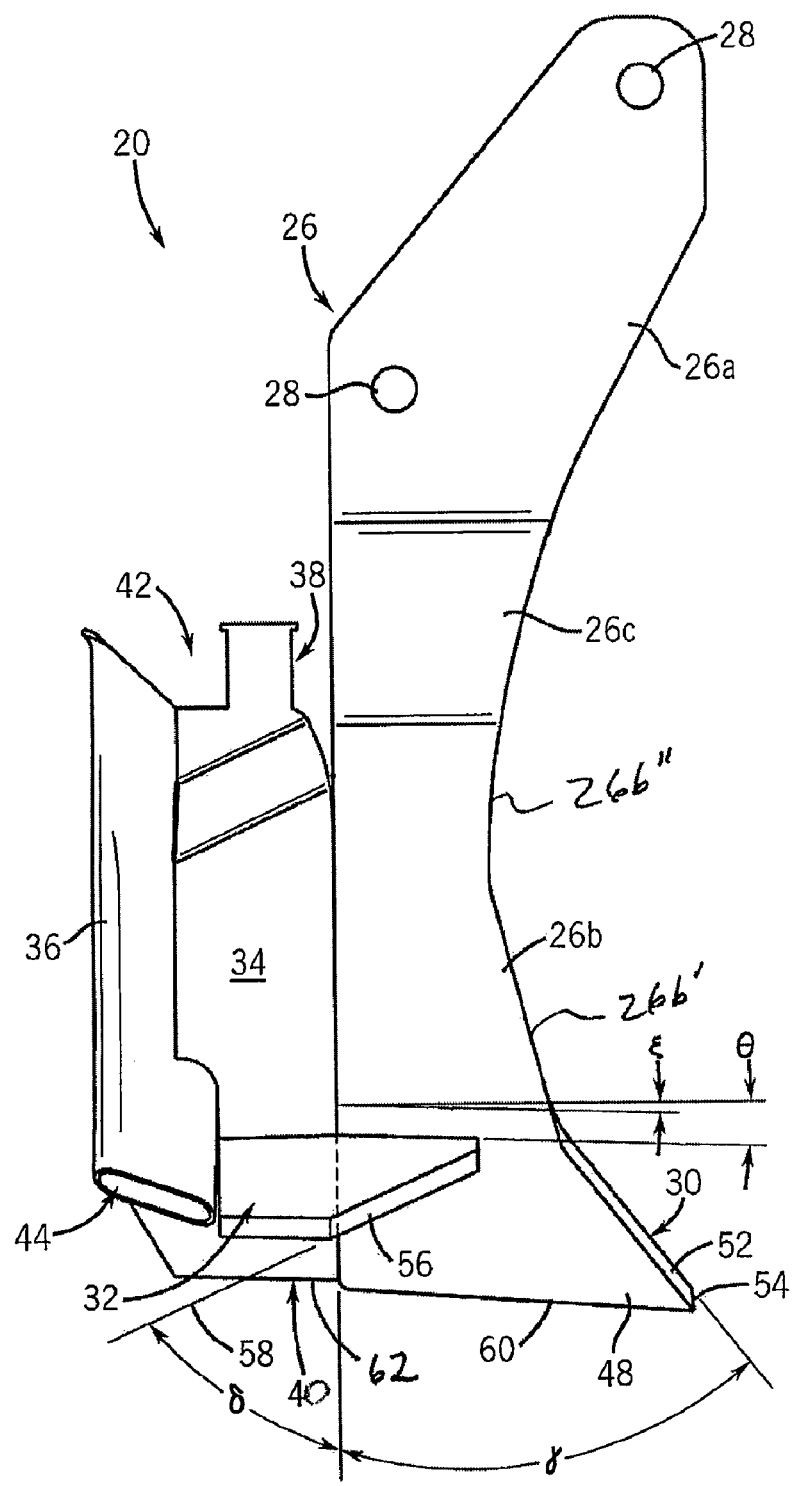
FIG. 4 is a side elevation view of the knife opener shown in FIG. 2.

As described above, blades 30 and 32 are flared relative to shank 26, as further illustrated in FIG. 3. In one representative embodiment, the shank 26 has an upper portion 26a and a lower portion 26b that are joined together by an angled portion 26c. The lower portion 26b generally extends about a vertical axis 46 and the blades 30, 32 extend downwardly from the lower portion 26b and angled relative to the vertical axis 46. As shown in FIG. 4, the profile of the lower portion 26b has an inwardly angled portion 26b' and an outwardly angled portion 26b"; however, it is understood that the invention is not so limited. For example, in one alternate embodiment the lower portion 26b is faceted such that the leading edge of lower portion 26b is curved.

In one preferred embodiment, the inside edge 48 of blade 30 is angled relative to the vertical axis 46 at angle of approximately 25 degrees; but it is understood that the blade 30 could be formed to extend at other angles. However, it is generally preferred that the angle α be between approximately 15 degrees and approximately 60 degrees. Blade 32 is angled relative the vertical axis, as defined by its inner edge 50, at a preferred angle α of 30 degrees but it is understood that the blade 32 could be formed to be angled at other angles. However, it is generally preferred that the angle β be between approximately 15 degrees and approximately 60 degrees Referring now to FIG. 4, in addition to its flared orientation, shanks 30 and 32 are also biased in a forward direction and a rearward direction, respectively. More particularly, the backside of the shank generally defines a vertical axis 50 and the angle γ defined between the vertical axis 50 and the leading edge 52 of the blade 30 is preferably approximately 35 degrees, but other angular orientations are possible. Preferably, the angle γ is between approximately 15 degrees and approximately 60 degrees. As illustrated in FIG. 4, the leading edge 52 of blade 30 has a tip portion 54 and the angle γ is measured between the tip portion 54 and the vertical axis 50.

As illustrated in FIG. 4, preferably the cutting edge 52 of blade 30 is significantly in advance of the lower portion 26b of the shank 26. Deeper soil is cut and lifted in advance of cutting the surface soil allowing the surface to be cut more easily and without undue lateral disruption. In addition, vertical motion is limited. Moreover, the blade 30 cuts through the surface and trash layers without accumulating trash on the shank 26.

The rearward extending blade 32 also has a leading edge 56 and the leading edge 56 extends along an imaginary axis 58 that is angled relative to the vertical axis 50 at an angle δ. In one preferred embodiment, the angle δ is approximately 60 degrees; however, other angles are possible. It is generally preferred however that the angle δ fall between approximately 15 degrees and approximately 75 degrees.

As further illustrated in FIGS. 3-4, in a preferred embodiment, the bottom edge 60 of blade 30 sits lower than the bottom edge 62 of blade 32. Thus, blade 30 cuts a furrow that is deeper than the furrow cut by blade 32. This allows a stratification in the vertical plane of seed and fertilizer in the paired furrows. It is appreciated however that the blades 30, 32 could be oriented so that the bottom edges 60, 62 are in the same plane and thus cut furrows of substantially the same depth.

In one representative embodiment, the width of the furrow cut by blade 30 is the same as that cut by blade 32, but it is contemplated that the blades 30, 32 could be sized such that different sized furrows are cut.

Referring again to FIG. 4, not only are the blades 30 and 32 flared with respect to vertical axis 46 and angled with respect to vertical axis 50, the blades also have respective pitch angles or "rake angles". In a preferred embodiment, blade 30 has a rake angle ε between approximately 0 degrees and approximately 15 degrees, and preferably 2 degrees. Similarly, blade 32 has a rake angle θ between approximately 0 degrees and approximately 15 degrees, and preferably 2 degrees.

The flared blades 30, 32 are designed such that each blade temporarily lifts a flap of soil then the flaps are lowered gently back after the knife opener is passed. Seed and/or fertilizer is deposited and is preferably covered as the flap settles back. As a result, the layers of the soil are preserved, during seeding and fertilizing. Thus, it is possible to plant seed or lay fertilizer without disturbing the stratification of the soil. It may be noted that the press wheels 18 may press the flaps back down, and assist in the maintenance of the stratification.

It is further understood that the invention is not limited to the exact shapes, sizes and orientations shown and described herein. For example, the blades may be shaped to have a rounded or blunted leading tip rather than the pointed tip shown in the figures. Similarly, the leading edge of the shank may be rounded, planar, or other geometrical shape. In addition, it is contemplated that one or more known or to be developed manufacturing techniques may be used to construct the soil preparation tool shown and described herein. For example, the blades could be welded to the shank or the blades and shank could be cast as a single unitary structure. It is also recognized that the individual components of the knife openers described herein may be coupled in a known manner whereby the individual components can be removed and/or replaced as desired.

Maintenance of soil stratification is important in currently-favored minimum-till farming regimes because moisture in the layers a few centimeters down is not dissipated, weed seeds on the surface remain on the surface and do not germinate, and stalks and vegetation at the surface remain intact providing cover and moisture retention.

Various alternatives and embodiments are contemplated as being within the scope of the following claims particularly pointing out and distinctly claiming the subject matter regarded as the invention.

We claim:

1. A soil preparation tool for use with an agricultural implement, comprising:
   a tool body shank having an upper portion, a lower portion and an angled portion; said upper and lower portion are joined together at said angled portion;
   said lower portion extends about a vertical axis;
   a forward biased blade connected to the lower portion of said tool body shank and extending downwardly and forward and angled away from the vertical axis at a first angle relative to the vertical axis; and
   a rearward biased blade connected to the lower portion of said tool body shank and extending rearward and downwardly and angled away from the vertical axis at a second angle relative to the vertical axis;
   wherein said rearward biased blade is smaller than said forward biased blade;
   wherein said forward biased blade laterally offset in a first direction and the rearward biased blade laterally offset in a second direction generally opposite the first direction.

2. The soil preparation tool of claim 1 further comprising a product delivery device coupled to the vertical body and associated with one of the first knife member and the second knife member.

3. The soil preparation tool of claim 2 further comprising another product delivery device coupled to the vertical body and associated with the other one of the first knife member and the second knife member.

4. The soil preparation tool of claim 3 wherein the product delivery devices are designed to deposit seed or fertilizer onto a field.

5. The soil preparation tool of claim 1 wherein the first angle is between approximately 15 degrees and approximately 60 degrees from the vertical axis.

6. The soil preparation tool of claim 1 wherein the second angle is between approximately 15 degrees and approximately 60 degrees.

7. The soil preparation tool of claim 1 wherein the first knife member has a rake angle between approximately 0 to approximately 15 degrees.

8. The soil preparation tool of claim 1 wherein the second knife member has a rake angle between approximately 0 to approximately 15 degrees.

* * * * *